US008949469B2

(12) United States Patent
Gerdes et al.

(10) Patent No.: US 8,949,469 B2
(45) Date of Patent: Feb. 3, 2015

(54) METHOD FOR SOFTWARE PROGRAM SYNCHRONIZATION

(75) Inventors: Martin Gerdes, Monschau-Rohren (DE); Silke Holtmanns, Klaukkala (FI); Raphaël Quinet, Liège (BE); Marko Schuba, Aldenhoven (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1013 days.

(21) Appl. No.: 11/573,705

(22) PCT Filed: Aug. 14, 2004

(86) PCT No.: PCT/EP2004/009148
§ 371 (c)(1),
(2), (4) Date: Oct. 9, 2007

(87) PCT Pub. No.: WO2006/018030
PCT Pub. Date: Feb. 23, 2006

(65) Prior Publication Data
US 2008/0215758 A1      Sep. 4, 2008

(51) Int. Cl.
*G06F 15/16*      (2006.01)
*G06F 9/445*      (2006.01)
*H04L 29/08*     (2006.01)

(52) U.S. Cl.
CPC .............. *G06F 8/65* (2013.01); *H04L 67/1095* (2013.01); *H04L 67/303* (2013.01); *H04L 67/34* (2013.01)
USPC ....................................................... 709/248

(58) Field of Classification Search
CPC . G06F 15/17325; G06F 2216/15; G09G 5/12; H04L 67/1095
USPC .............................. 709/248; 705/59; 717/168
See application file for complete search history.

(56) References Cited

U.S. PATENT DOCUMENTS 5,790,664 A * 8/1998 Coley et al. ................... 709/203
6,678,741 B1 * 1/2004 Northcutt et al. ............. 709/248

(Continued)

FOREIGN PATENT DOCUMENTS

WO       WO 00/36503 A      6/2000

OTHER PUBLICATIONS

JSR 118 Expert Group: "Passage from Mobile Information Device Profile, v2.0 (JSR-118)" JSP Specification, Nov. 5, 2002, XP002318884 p. 5, p. 433-p. 436, p. 513-p. 514.

(Continued)

*Primary Examiner* — Esther Benoit (57) ABSTRACT

A method, devices, and a computer program for synchronizing one or more software programs from a first device (D100) to a second device (D200) are disclosed. The method comprises the steps of creating (100) an application profile indicating one or more software programs on the first device (ID100) and indicating one or more software program providing nodes (SN 100,SN200) from which said one or more software programs are obtainable, providing (200) the application profile to a synchronization manager (SM 100), identifying (300) by the synchronization manager (SM 100) the one or more software programs and the one or more software program providing nodes (SN100,SN200) according to the application profile, requesting (400) by the synchronization manager (SM 100) the one or more software program providing nodes (SN 100,SN200) to transfer the one or more software programs, and transferring (500) the one or more software programs from the one or more software program providing nodes (SN 100,SN200) to the second device (D200).

22 Claims, 7 Drawing Sheets

(56) References Cited

U.S. PATENT DOCUMENTS

| | | | |
|---|---|---|---|
| 7,043,724 B2 * | 5/2006 | Blume et al. | 717/168 |
| 2002/0026474 A1 | 2/2002 | Wang et al. | |
| 2003/0046433 A1 * | 3/2003 | Luzzatti et al. | 709/248 |
| 2003/0182563 A1 * | 9/2003 | Liu et al. | 713/191 |
| 2004/0015942 A1 | 1/2004 | Branson et al. | |
| 2004/0045000 A1 | 3/2004 | Hara | |
| 2005/0014531 A1 * | 1/2005 | Findikli | 455/557 |
| 2005/0229036 A1 * | 10/2005 | Milstein et al. | 714/13 |
| 2007/0043675 A1 * | 2/2007 | Birzer et al. | 705/51 |

OTHER PUBLICATIONS

JSR 118 Expert Group: "Mobile Information Device Profile, v2.0 (JSR-118)" JCP Specification Nov. 5, 2002, XP002318884 p. 5, p. 433-p. 436, p. 513-p. 514.

Wireless Application Protocol Forum, WAG UAProf, WAP-248-UAPROF-20011020-a, Version Oct. 20, 2001.

SyncML Syn Protocol, version 1.1, Feb. 15, 2002, pp. 1-62.

* cited by examiner

METHOD FOR SOFTWARE PROGRAM SYNCHRONIZATION

FIELD OF THE INVENTION

The present invention relates to computing and communication, in particular to a method for synchronization of one or more software programs from a first device to a second device.

BACKGROUND OF THE INVENTION

In modern times, users are confronted with more and more devices likes personal computers, laptop computers, personal digital assistants, smart phones, mobile phones, and other devices capable of operating software programs and processing and communicating data. Synchronization between devices is a critical issue to avoid negative user experience and non-usage of otherwise good device functionalities.

It is known to synchronize non-user specific device capabilities like e.g. the screen size, the computing power, the operational system, the Wireless Application Part version etc. by a Wireless Application Part User Profile Agent (WAP UAP). Furthermore, user data like electronic calendar entries, address book entries, or emails can be synchronized between devices. For example, calendar entries in an electronic calendar on a personal computer can be synchronized with an electronic calendar on a mobile phone or vice versa. The SyncML Sync Protocol is a protocol that supports synchronization of user data between a SyncML client and a SyncML server, see SyncML Sync Protocol, version 1.1 (Feb. 15, 2001) at Open Mobile Alliance (OMA) web pages.

When the user changes from a first to a second device, he is usually confronted with the problem that the software program he is used to operate on the first device is not present on the second device. For example, the user may use an electronic calendar of a first kind on the first device but when operating the second device he may only find an electronic calendar of a second kind with totally different user interface and operation characteristics. While it may be possible to synchronize the calendar entries e.g. via SyncML, it is not very user-friendly to require the user to adapt to the different user interface and different operability of the same purpose software programs on the two devices. The problem occurs also, when the user buys a new device where the software programs he is used to operate are not present.

The problem is further intensified by the increasing number and variety of devices a user operates caused e.g. by innovation, very short development and time-to-market periods, an increasing number of niche devices and intensive marketing increasing the demand for new devices. However, with increasing number of devices being replaced in shorter and shorter time intervals, the user feels a strong need for operating the same software programs on his devices which reduces time and effort for training. What is needed is therefore a solution, which provides the user with software programs that he is used to operate on a first device on one or more further devices.

SUMMARY OF THE INVENTION

It is an object of the present invention to provide a method, devices, and a computer program, which provide a solution to the aforementioned problem.

This object is achieved by the method as described in claim 1. Furthermore, the invention is embodied in a synchronization manager according to claim 9, devices according to claim 17 and 21, and a computer program according to claim 23. Advantageous embodiments are described in the further claims.

The invention discloses a method for synchronizing one or more software programs from a first device to a second device. First of all, an application profile is created. The application profile indicates one or more software programs on the first device and further indicates one or more software program providing nodes from which said one or more software programs can be obtained. The application profile may comprise at least one software program name for indicating the one or more software programs and at least one node address for indicating the one or more software program providing nodes. It may further comprise at least one version indicator for indicating at least one version of the one or more software programs and/or a licensing indicator for indicating if a license is required.

The method continues by providing the application profile to a synchronization manager. The one or more software programs and the one or more software program providing nodes are identified by the synchronization manager according to the application profile indicating the one or more software programs on the first device and the one or more software program providing nodes from which said one or more software programs can be obtained. For example, the synchronization manager may identify the one or more software programs according to the at least one or more software program names comprised in the application profile and the software program providing nodes from which said one or more software programs are obtainable according to the at least one node address comprised in the application profile. Furthermore, a version of a software program may be identified based on a version indicator comprised in the application profile.

Furthermore, the synchronization manager requests the one or more software program providing nodes to transfer the one or more software programs. Finally, the one or more software programs are transferred from the one or more software program providing nodes to the second device.

The invention provides the user with one or more software programs that he is used to operate on a first device on a second device by a synchronization based on an application profile and the use of a synchronization manager.

Accordingly, software programs on the first device can be transferred from software program providing nodes to the second device in a very, flexible and convenient way such that the user can be automatically provided with these software programs on the second device. User-friendliness, device change acceptance, and operability of multiple devices are thus ensured.

According to a preferred embodiment, for at least a part of the one or more software programs according to the application profile one or more corresponding software programs exist. A corresponding software program is a software program that corresponds to a software program as indicated by the application profile. As an example, a software program according to the application profile and the corresponding software program may have the same name but may differ regarding the version. In case one or more corresponding software programs exists, it can be of advantage if the one or more corresponding software programs are transferred instead of or in addition to said part of the one or more software programs according to the application profile. This transfer of the corresponding one or more software programs may be a result of an analysis of said part of the one or more software programs according to the application profile and the one or more corresponding software programs, e.g. by comparing version indicators. Thus the transfer of one or more corresponding software programs provides the user with one or more software programs that can be operated identically or quite similar to the one or more he is used to operate on his first device but offer the advantage that they are e.g. of a newer version or are better adapted to the second device. If both the one or more software programs according to the application profile and the one or more corresponding programs are transferred, the user may be enabled to select the one or more software programs he would like to use, e.g. by a menu presenting the transferred software programs for a selection by the user.

According to another preferred embodiment, the application profile comprises at least one license indicator for indicating and identifying at least a part of the one or more software programs requiring a license. The license indicator can comprise a license. When identified that a license is required, a request can be communicated to a license authority for requesting an authorization of the transfer to the second device or said part of the one or more software programs for that the license is required from the one or more software program storages where said part of one or more software programs requiring the license are obtainable from. The license authority can e.g. authorize the transfer by communicating one or more messages to the one or more software program providing nodes from which the one or more software programs requiring the license are obtainable from for instructing these one or more software program providing nodes to release said one or more software programs for the transfer to the second device. The authorization by an license authority provides more control over the synchronization as a provider of licensed software programs typically issues a license for a software program to be used on a single device, i.e. the first device. If the software program is now to be used on a second device, a license update may be required with or without related charging, e.g. to charge for a license for operation of the transferred one or more software programs on the second device.

The security can be enhanced by introducing at least one authentication step for verifying at least one identity of at least one of the first device, the second device, an user of the first device, an user of the second device, and at least one of the one or more software program providing nodes before transferring the one or more software programs to the second device. The user of the first device and the user of the second device are in most cases identical, however, the user of the second device can be different from the user of the first device, at least temporarily. For example if administrator rights are required for the transfer of the software programs to the second device, the user of the first device may request an administrator to perform an authentication for the transfer of the one or more software programs. After the transfer is completed, the user of the first device and/or the administrator may operate the transferred one or more software programs on the second device. Furthermore, one and the same user of the first and second device may use one and the same identity or alternatively different identities for the authentication.

A further enhancement comprises the step of a selective charging of the transferred one or more software programs. For example, not all transferred software programs may be charged but only those for which a license is required and/or only those for which one or more corresponding software programs are transferred in addition or alternatively. Thus, selective charging is an intelligent charging tool for the synchronization service according to the invention.

The application profile can be created whenever a change of the one or more software programs on the first device occurs. Examples for a change are a transfer or installation of a new program on the first device or when at least one of the one or more software programs on the first device is deleted, inactivated, or modified. Thus, triggering the creation by a software program change event ensures that the application profile can be updated for indicating the current software programs on the first device.

The invention is furthermore embodied in a synchronization manager, devices, and a computer program, which are described in the following.

A synchronization manager is disclosed for synchronizing one or more software programs from a first device to a second device. The synchronization manager is adapted to receive an application profile indicating one or more software programs on the first device and indicating one or more software program providing nodes from which said one or more software programs are obtainable. The synchronization manager is further adapted to identify the one or more software programs and the one or more software program providing nodes according to the application profile. For example, the synchronization manager can be adapted to process the application profile comprising at least one software program name indicating the one or more software programs and at least one node address indicating the one or more software program providing nodes for identifying the one or more software programs and the one or more software program providing nodes, respectively. The synchronization manager is further adapted to request the one or more software program providing nodes to transfer the one or more software programs to the second device.

According to a preferred embodiment, the synchronization manager can be further adapted to process the application profile comprising at least one version indicator indicating at least one version of the one or more software programs for identifying the at least one version of the one or more software programs.

For at least a part of the one or more software programs according to the application profile one or more corresponding software programs can exist. In this case, the synchronization manager is preferably adapted to process, e.g. to accept, install, or discard, the one or more corresponding software programs that are transferred instead of or in addition to said part of the one or more software programs according to the application profile as a result of an analysis of said part of the one or more software programs according to the application profile and the one or more corresponding software programs.

According to another preferred embodiment, the synchronization manager can be adapted to process the application profile comprising at least one license indicator indicating that at least a part of the one or more software programs requires a license. Accordingly, the synchronization manager can be further adapted to initiate a communication of a request to a license authority for requesting an authorization of the transfer to the second device of said part of the one or more software programs for that the license is required from the one or more software program storages where said part of one or more software programs requiring the license are obtainable from.

According to another preferred embodiment, the synchronization manager can be further adapted to perform an authentication. Accordingly, the synchronization manager can be adapted to verify at least one identity of at least one of the first device, the second device, an user of the first device, an user of the second device, and at least one of the one or more software program providing nodes before initiating or accepting the transferring of the one or more software programs to the second device.

According to another preferred embodiment, the synchronization manager can be further adapted to process and/or provide data for a selective charging of the transferred one or more software programs.

The synchronization manager can be operated on an entity like a server in a communications network, on the first device, or on the second device. The synchronization manager may be a device that may be internal or attachable to one of the aforementioned entities. The synchronization manager may be embodied in a computer program comprising code adapted to perform the operations of the synchronization manager when operated on one of the aforementioned entities. The synchronization manager may even be distributed over several entities for a distributed operation of the synchronization manager, e.g. for redundancy or parallel-processing reasons or customized solutions.

In the following, the first and second devices are described in more detail.

The first device comprises at least a processing unit and an output unit and typically also one or more software program storage units where the one or more software programs that can be operated on the first device can be stored.

The processing unit of the first device can be adapted to create an application profile indicating the one or more software programs on the first device, e.g. by searching the one or more aforementioned software storage units for software programs. The processing unit of the first device can be further adapted to execute for the synchronization of the one or more software programs to a second device a transfer of the application profile to at least one of a synchronization manager, the second device, and an application profile storage node in a communications network.

According to a preferred embodiment, the processing unit of the first device can be adapted to create the application profile whenever a change of the one or more software programs on the first device occurs, e.g. whenever a software program on the first device is deleted, inactivated, or modified or a new software program is transferred to and/or installed on the first device.

According to another preferred embodiment, the processing unit of the first device can be adapted to generate a message comprising the application profile and to send the message via the output unit for the transfer of the application profile. Alternatively or in addition, the processing unit of the first device can be adapted to store the application profile on a movable storage medium being removable from the output unit for the transfer of the application profile.

The first device can be further adapted to operate the synchronization manager. Accordingly, the processing unit of the first device can be further adapted to identify the one or more software programs and the one or more software program providing nodes according to the application profile, the output unit can be adapted to send one or more request messages for requesting the one or more software program providing nodes to transfer the one or more software programs to the second device.

The second device according to the invention comprises at least an input unit, an output unit, and a processing unit. The input unit of the second device receives the one or more software programs that are to be synchronized from the first device to the second device. Preferably, the second device can operate the synchronization manager. Accordingly, the input unit of the second device can be adapted to receive an application profile indicating one or more software programs on the first device annex indicating one or more software program providing nodes from which said one or more software programs are obtainable. Furthermore, the processing unit of the second device can be adapted to identify the one or more software programs and the one or more software program providing nodes according to the application profile. The output unit of the second device can be adapted to send one or more request messages for requesting the one or more software program providing nodes to transfer the one or more software programs and the input unit of the second device can be adapted to receive the one or more software programs as already stated above.

Furthermore, the input unit of the second device can be adapted to receive the application profile from at least one of an application profile storage node in a communication networks, the first device, and a movable storage medium.

The respective units of the first device or the second device can be adapted to perform further operations of the synchronization manager described in the following in more detail:

The processing unit of the first or second device can be adapted to process the application profile comprising at least one software program name indicating the one or more software programs and at least one node address indicating the one or more software program providing nodes for identifying the one or more software programs and the one or more software program providing nodes.

The processing unit of the first or second device can be adapted to process the application profile comprising at least one version indicator indicating at least one version of the one or more software programs for identifying the at least one version of the one or more software programs.

For at least a part of the one or more software programs according to the application profile one or more corresponding software programs can exist. Accordingly, the processing unit of the first or second device can be adapted to process that one or more corresponding software programs are transferred instead of or in addition to said part of the one or more software programs according to the application profile as a result of an analysis of said part of the one or more software programs according to the application profile and the one or more corresponding software programs.

The processing unit of the first or second device can be adapted to process the application profile comprising at least one license indicator indicating that at least a part of the one or more software programs requires a license, to request an authorization by a license authority of the transfer to the second device of said part of the one or more software programs for that the license is required from the one or more software program providing nodes from which said part of one or more software programs requiring the license are obtainable.

The processing unit of the first or second device can be adapted to perform an authentication wherein the processing unit is adapted to verify at least one identity of at least one of the first device, the second device, the one or more software program providing nodes, and an user of the first device and an user of the second device before accepting the transferring of the one or more software programs to the second device.

The processing unit of the first or second device can be further adapted to process and/or provide data for a selective charging of the transferred one or more software programs.

The invention is furthermore embodied in a computer program comprising code adapted to operate the tasks of the synchronization manager as described when operated by a processing unit of e.g. the first device, the second device, or a server in a communication network. In particular, the computer program may comprise code adapted to process an application profile indicating one or more software programs on the first device and indicating one or more software program providing nodes from which said one or more software programs are obtainable, to identify the one or more software programs and the one or more software program providing nodes according to the application profile, and to initiate a request of the one or more software program providing nodes to transfer the one or more software programs to the second device. The computer program may comprise further code adapted for the execution of further tasks of the respective devices, e.g. to perform the creation of the application profile or to perform communications or transfers via input and/or output units.

In the following, detailed embodiments of the present invention shall be described in order to give the skilled person a full and complete understanding. However, these embodiments are illustrative and not intended to be limiting.

DETAILED DESCRIPTION OF THE INVENTION

Figure 1:
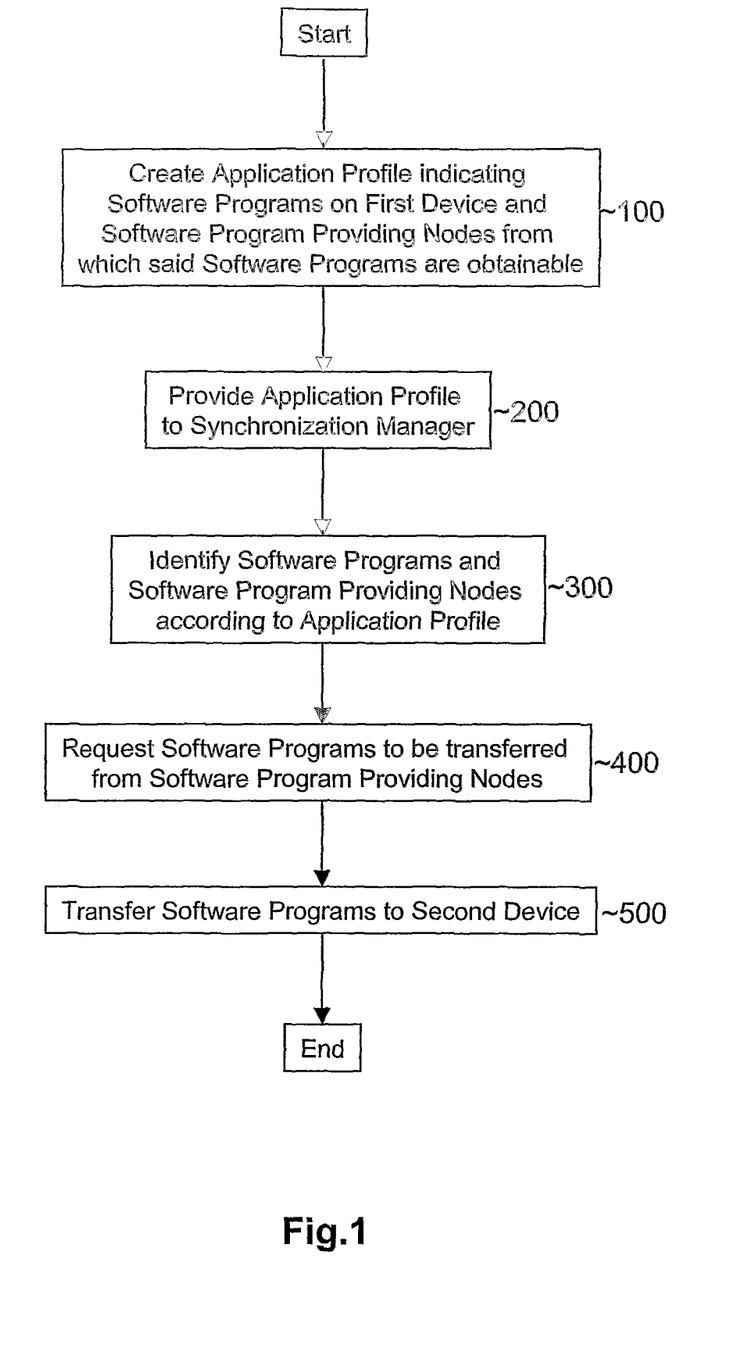
FIG. 1 shows a flow chart of steps of the method.

FIG. 1 shows a flow chart with steps of the method. In a first step 100, an application profile is created. The application profile indicates software programs on a first device and software program providing nodes from which said software programs can be obtained. An example for an application profile is depicted in Tab. 1.

TABLE 1

Example for an application profile according to the invention

| Software Program Name | Version Indicator | Node Address | License | Address of License Authority |
|---|---|---|---|---|
| NN11 | 1 | URL11 | — | — |
| NN22 | 2-5 | URL22 | — | — |
| NN33 | 3 | URL33 | — | — |
| NN44 | 2002 | URL44 | — | — |
| NN44 | 2004 | URL44 | LI44 | URL4444 |
| NN55 | 4.0 | URL55 | — | — |
| NN55 | 4.0 | IP55 | — | — |

Software programs on the first device can be indicated by software program names NN11-NN55. The software program names can be supplemented by version indicators like a number 1, 3 or 4.0, a number range 2-5, or a date like release 2002 or 2004 to further differentiate the software programs on the first device. Other types of version indicators are possible which can be used instead or in addition to the version indicators shown in Tab. 1 for an alternative or more precise indication of the software programs on the first devices, e.g. it may be useful to indicate the type of the first device being e.g. a mobile phone of a particular type of a particular vendor for more precisely indicating the software program. The software programs as indicated by the first two columns can be obtained from software providing nodes with node addresses UPL11-URL55, IP55 given in the third column. According to the present example, node addresses URL11-55 denote Uniform Resource Locator (URL)-addresses and node address IP55 denotes an Internet Protocol (IP)-address like an IPv4 or IPv6 address. Other types of node addresses for indication of software program providing nodes are possible, e.g. a Mobile Station Integrated Services Digital Network (MSISDN) number for indicating a server from which software programs may be obtainable via a mobile communication network like the Global System for Mobile Communication (GSM), General Packet Radio Service (GPRS), Code Division Multiple Access (CDMA), Universal Mobile Telecommunication System (UMTS), or future 4$^{th}$ Generation (4G) communication systems.

The application profile may further comprise a licensing indicator for indicating whether a certain program requires a license, which is according to the present example the software program NN4 of version 2004 for that a license is required. The license indicator may comprise the license. The application profile may further comprise one or more license authority addresses for indicating the one or more license authorities to be contacted for authorizing the transfer of the one or more respective software programs to the second device. According to the present example, a license authority address URL4444 may be contacted to authorize the transfer of the software program NN44 version 2004 from the software program providing node of node address URL44 for the transfer to the second device.

Software program names, version indicators, node addresses, license indicators, and addresses of license authorities can be related in many ways. One way is in form of a table as depicted in Tab. 1 where individual software programs are listed row-by-row. One software program name can be listed in multiple rows as e.g. multiple versions may be on the first device like for software program N44 or to indicate that the same software program NN55 of the same version may be obtainable from different node addresses life URL55 and IP55. Other variations are possible. An alternative representation of the application profile is a set of data strings. Each data string can comprise an individual software program name with all its possible versions, node addresses, license identifiers, license authority addresses etc. The entries of Tab. 1 in an exemplary data string notation may be as <<NN11|1|URL11>> for software program NN1, <<NN22|2-5|URL22>> for software program NN22 comprising version range 2-5, <<NN33|3|URL33>> for software program NN33, <<NN44|2002,2004|URL44|-,LI44|-,URL4444>> for software program NN44 comprising the two version alternatives 2002 and 2004 with and/without required license, and <<NN55|4.0|URL55,IP55>> for software program NN55 with redundant node addresses. Thus, a set of data strings may be a more compact representation of the application profile.

The application profile may indicate further requirements of the one or more software programs. Examples for further requirements are certain underlying software like an operation system or certain packages like Java or Perl packages or libraries that are required for the operation of the one or more software programs. For indication and identification purpose, the application profile may further comprise one or more name identifiers and/or one or more addresses of nodes from which the further requirements are obtainable, e.g. in form of separate columns in a table like Tab. 1 or separate entries in a data string.

Referring again to FIG. 1, wherein the method proceeds to step 200 to provide the application profile to a synchronization manager. The synchronization manager subsequently identifies in step 300 the software programs and the software program providing nodes from which the software programs are obtainable. The synchronization manager identifies the software programs and the software program providing nodes according to the application profile, i.e. the synchronization manager can analyze the provided application profile to identify the software programs and the software program providing nodes as indicated by the application profile, e.g. based on software program names and versions and node addresses according to Tab. 1. The synchronization manager can then in step 400 request that the software programs as indicated by the application profile are to be transferred from the indicated software program providing nodes. Before the transfer of the software programs from the software program providing nodes to the second device is executed in step 500, the synchronization manager may ask a license authority for an authorization of the transfer, e.g. for software program NN44 for that license entry LI44 indicates that software program NN44 version 2004 requires a license to be authorized by a license authority according to license authority address URL4444. The license or an indication thereof maybe transferred to the second device for processing and/or storage, e.g. on a security module. Alternatively or in addition, the license or its indication may be transferred to, processed and/or stored at the synchronization manager and/or may be kept at the licensing authority. Authentication and/or selective charging may be further employed.

FIG. 2-6 depict message flow diagrams for illustrating implementation possibilities of the invention. Identical devices, processes or messages are indicated by identical references unless otherwise stated. For readability reasons and not meant to be restrictive, the following description refers to multiple software programs stored on the first device D100 which are obtainable for the transfer to the second device D200 from the two software program providing nodes SN100, SN200.

Figure 2:
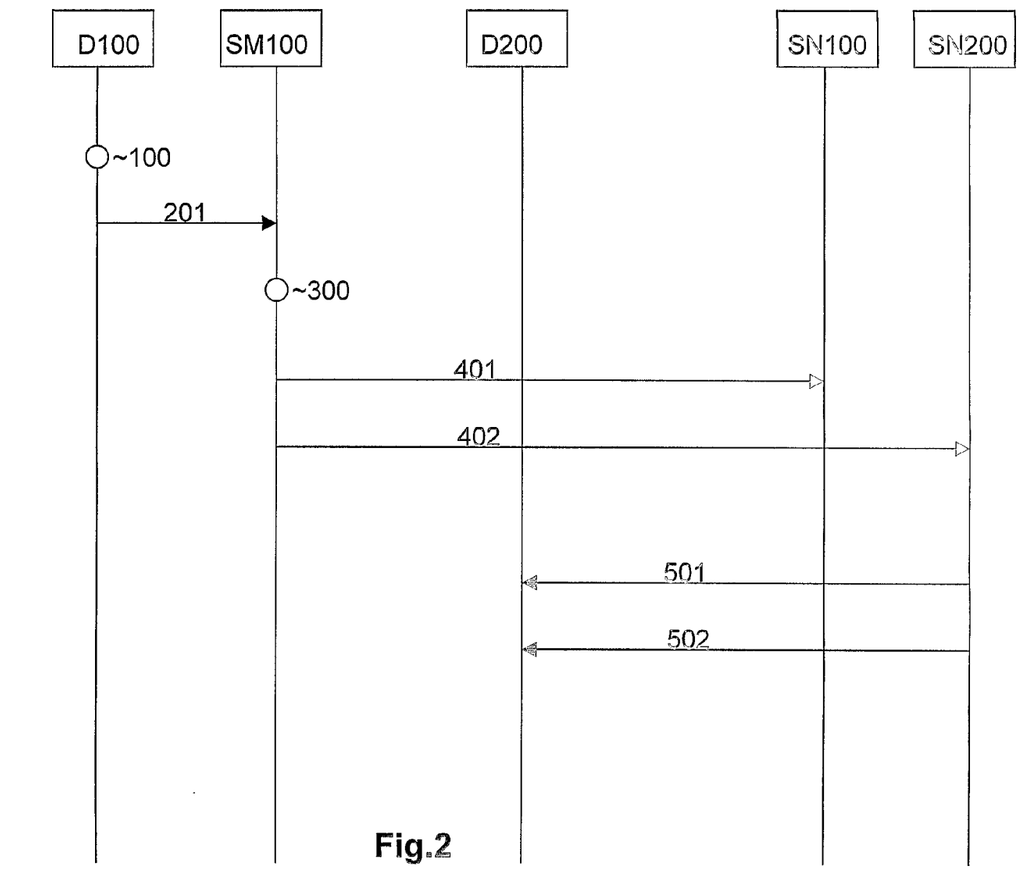
FIG. 2 shows a message flow diagram according to a first embodiment of the invention.

Referring now to FIG. 2, the first device D100 creates in process step 100 the application profile indicating the software programs stored on the first device D100 and the two software program providing nodes SN100, SN200 from which the indicated software programs are obtainable. The first device D100 communicates the application profile via message 201 to the synchronization manager SM100, which is according to the present example remote from the first and second devices D100, D200, e.g. a server in a communication network. The message 201 can comprise furthermore an identifier of the second device D200 like an address it indicate to the synchronization manager SM100 that the software programs are to be transferred to the second device D200. The synchronization manager SM100 identifies according to process step 300 the software programs and the software program providing nodes SN100,SN200 and sends request message 401,402 to request a transfer of the software programs from the respective software program providing nodes to the second device D200. For indication of the second device D200, the request messages 401,402 may be accompanied by an identifier of the second device D200 such that the requested software programs can be transferred from the respective software program providing nodes SN100,SN200 via messages 501,502 to the second device D200. Alternatively to FIG. 2, the messages 501,502 comprising the software programs are not sent directly from the respective software program providing nodes SN100,SN200 to the second device D200 but via the synchronization manager SM100, i.e. first from the respective software program providing nodes SN100,SN200 to the synchronization manager SM100 which then sends the software programs to the second device D200. According to the latter alternative, no identifier of the second device D200 has to be provided to the software program providing nodes SN100,SN200 which reduces the implementation complexity for the software program providing nodes SN100,SN200 as they do not have to identify and to contact the second device D200 for the transfer of the software programs. Instead, they can just send the software programs to the synchronization manager SM100 which requested them. The synchronization manager can then communicate messages comprising the software programs to the second device D200 for the transfer in a kind of push mode. Alternatively, the second device D200 may contact the synchronization manager SM100 for requesting the synchronization manager SM100 to transfer the software programs to the second device D200 in a kind of pull mode. Combinations of the aforementioned alternatives are possible.

Figure 3:
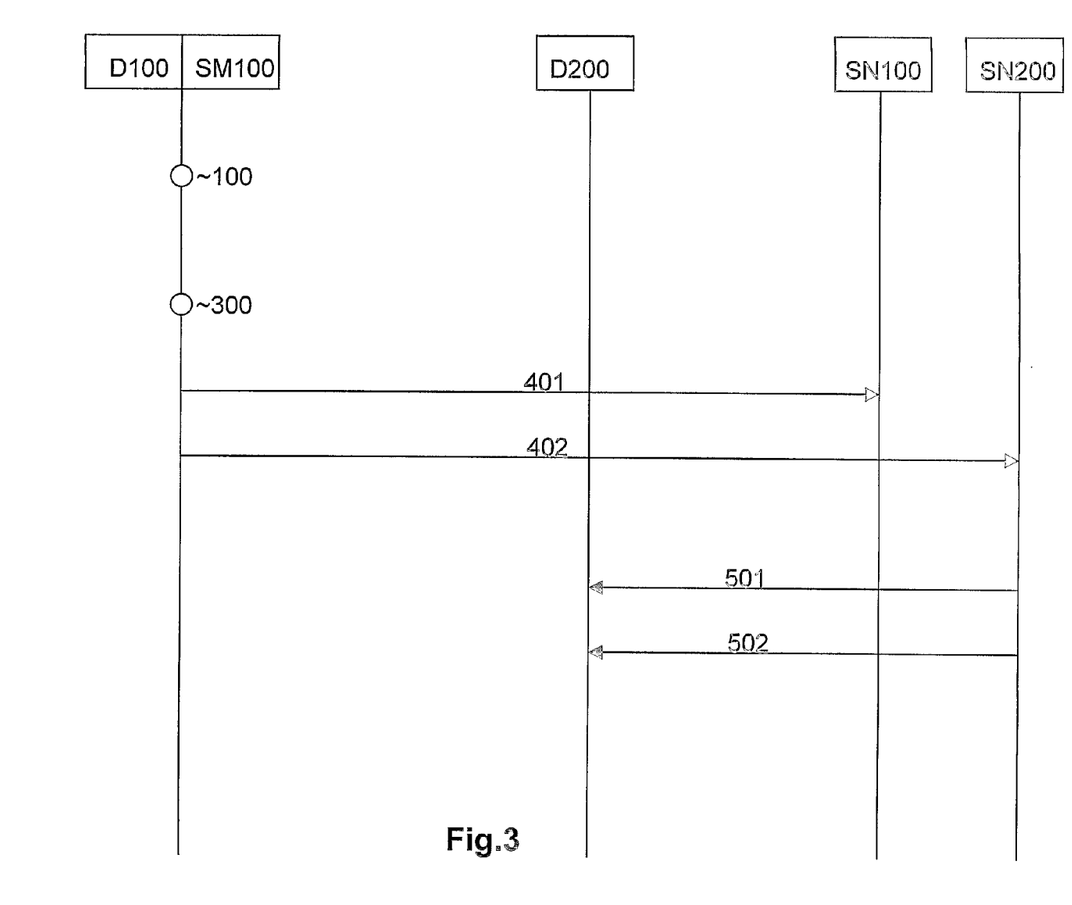
FIG. 3 shows a message flow diagram according to a second embodiment of the invention.

FIG. 3 depicts a flow diagram wherein the synchronization manager SM100 and the first device D100 are collocated on the same device performing process steps 100 and 300. The step 200 of providing the application profile to the synchronization manager SM100 is handled internally and explains why message 201 is not present in FIG. 3. The method for software program synchronization may be completed by messages 401,402,501,502 as depicted or various alternatives as described in conjunction with FIG. 2 or the next Figures.

Figure 4:
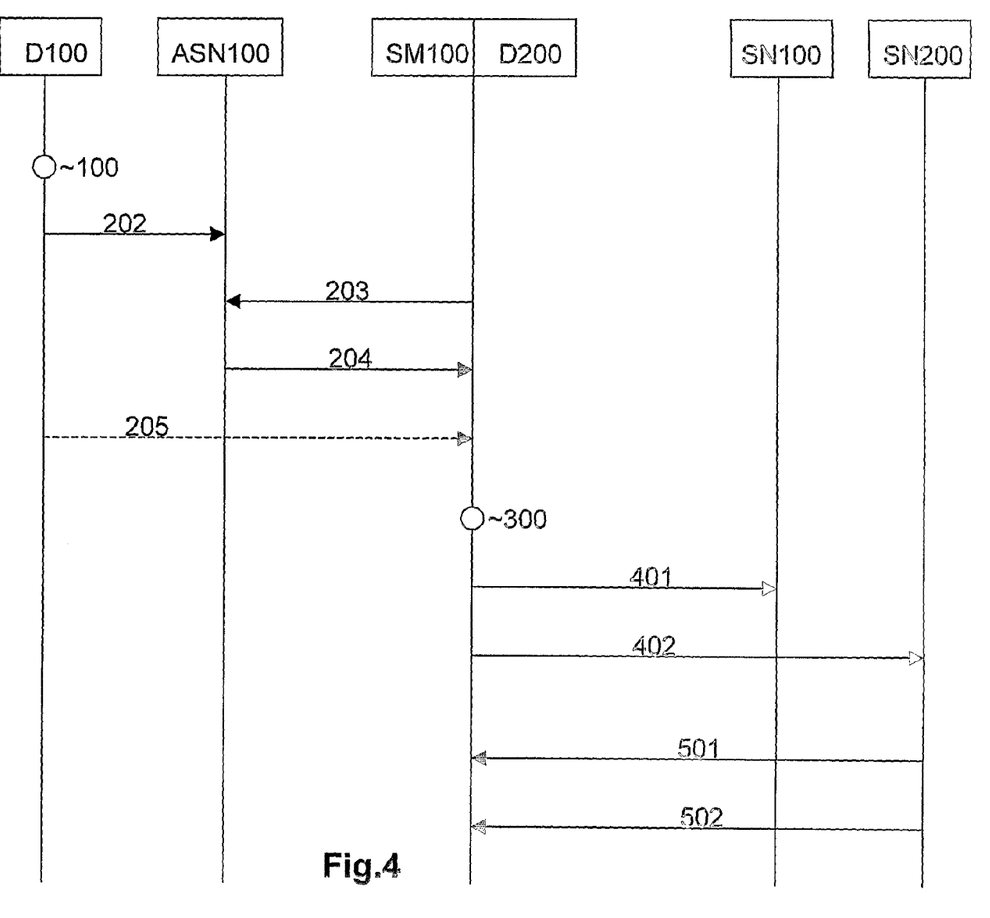
FIG. 4 shows a message flow diagram according to a third embodiment of the invention.

FIG. 4 illustrates two alternatives of providing the application profile created in step 100 on the first device D100 to the second device D200. The synchronization manager SM100 is now collocated with the second device D200. According to a first alternative, the application profile is communicated via message 202 from the first device DI 00 to an application profile storage node ASN100, e.g. a server in a communication network suitable for storing and accessing or providing data like an application profile. Next, the second device D200 requests the application profile from the application profile storage node ASN100 to be delivered to the second device D200. For this purpose, the second device D200 can send a request message 203 for requesting the application profile. For identifying the application profile at the application profile storage node ASN100, the application profile may be associated with an application profile identifier that can be communicated from the second device D200 to the application profile storage node ASN100 for identification of the application profile. In addition, the application profile storage node ASN100 may perform an authentication based on a provided identifier by itself or with the help of an authentication server providing e.g. a single-sign on service. After performing the necessary operations of identifying the application profile and optionally performing an authentication, the application profile storage node ASN100 communicates the application profile via message 204 to the synchronization manager SM100 collocated with the second device D200. The message 202 may comprise in addition an identifier of the second device D200 and the application profile storage node ASN100 may push the application profile to the synchronization manager SM100 collocated with the second device D200. Accordingly, a request message 203 may be not needed.

At second alternative of providing the application profile from the first device D100 to the second device D200 is a direct communication via communication path 205. The first device D100 may store (1) the application profile on a movable storage medium like a Subscriber Identity Module (SIM) or Wireless Identification Module (WIM) like card, a removable hardware token, or other type of memory cards. The movable storage medium can be removed (2) from an output unit like a card writer of the first device D100 and transferred (3) to the second device D200 where it can be inserted (4) into an input unit like a card reader and read (5) for providing the application profile to the synchronization manager SM100. Thus, the direct communication via communication path 205 can comprise the steps denoted as (1)-(5) according to the example described before. Alternatively, the communication path 205 may be realized by a cable or a wireless connection like an Infrared (IR) or Bluetooth connection for communicating the application profile from the first device D100 to the synchronization manager SM100 collocated with the second device D200. Further proximity communication techniques, e.g. short-range radio or Radio Frequency Identification (RFID) like communication can be used to communicate the application profile from the first device D100 to the synchronization manager collocated with the second device D200.

The use of an application profile storage node ASN100 can be of advantage as the one or more users of the devices D100,D200 do not have to care about any interconnection compatibilities between the first device D100 and the second device D200 which is required for the provision via communication path 205. On the other hand, the provision of the application profile via communication path 205 may be very simple and inexpensive if both devices are equipped with compatible interfaces in close vicinity. Especially, the transfer via a SIM or WIM-like card can be regarded as very secure and inexpensive.

After providing the application profile to the synchronization manager SM100, the message flow of FIG. 4 can continue by process step 300 and following messages 401,402, 501,502 as depicted or according to other alternatives.

Figure 5:
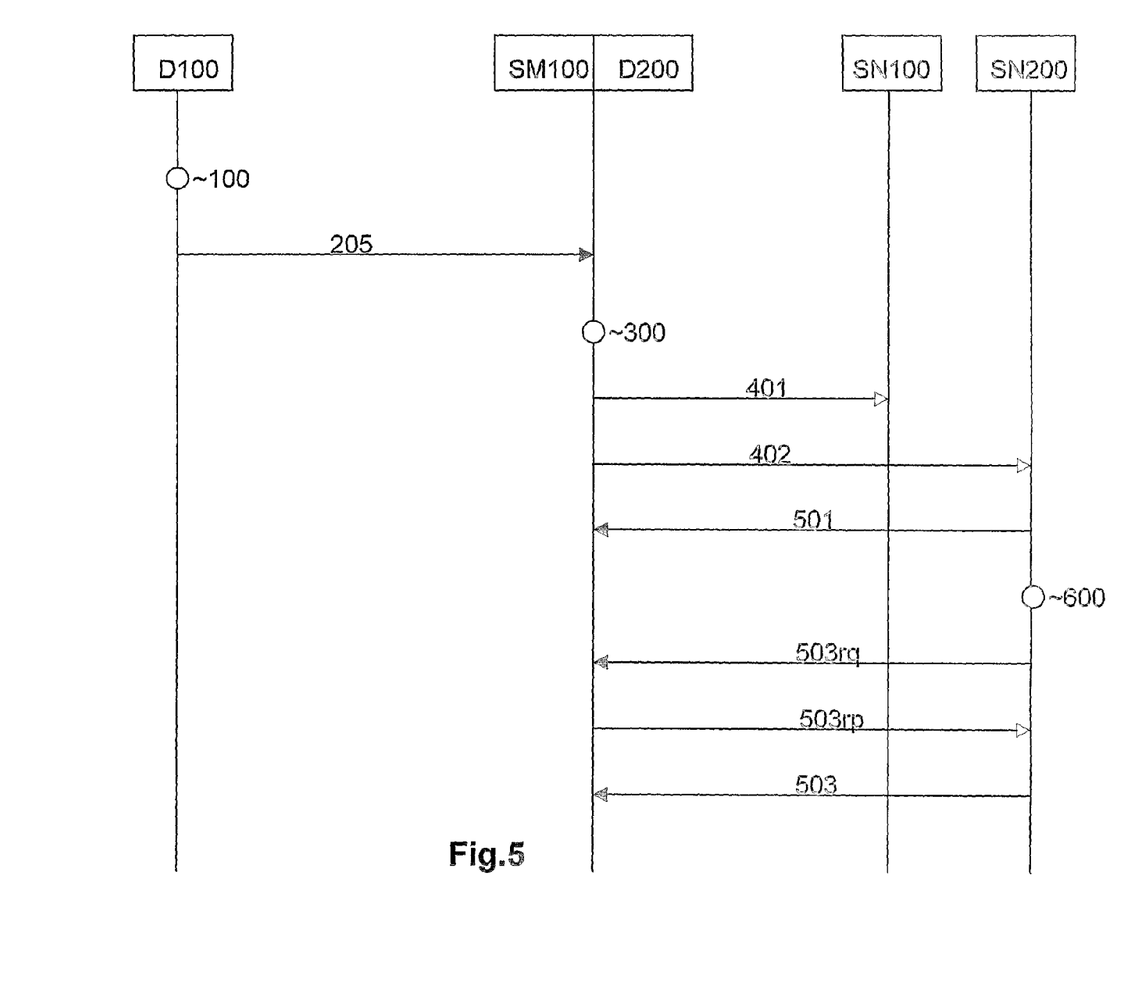
FIG. 5 shows a message flow diagram according to a fourth embodiment of the invention.

Referring now to FIG. 5 using a similar set-up as FIG. 4 regarding the creation of the application profile via process step 100, the provision of the application profile via communication path 205, the identification of the software programs and software nodes SN100,SN200 via process step 300, the request messages 401,402 and the message 501 comprising the one or more software programs of the software program providing node SN100. The software program providing node SN200 now detects in process step 600 that for one or more of the software programs requested by request message 402 one or more corresponding software programs exist, e.g. because the one or more corresponding software programs are newer. A further reason may be that the one or more corresponding programs are more suited to be operated on the second device D200, e.g. because the first device D100 is a personal computer and the second device D200 is a smart phone for that a light version of the PC software program would run significantly faster. A further example is when the first device D100 operates with a first operation system like Windows® and the second device D200 operates with a second operation system like Linux® or Symbian® for which a corresponding program must be transferred to be operable on the second device D200. For that reason, one or more identifiers identifying hardware and software types or capabilities of the second device D200 may be provided to the software program providing nodes SN100,SN200 for selecting the one or more corresponding programs to be best operable on the second device D200. The application profile may comprise these one or more identifiers, which may be e.g. entered by a user into the first device D100 for inserting or attaching to the application profile. The synchronization manager SM100 can subsequently provide these one or more identifiers derived from the application profile to the one or more software program providing nodes SN100,SN200. Alternatively or in addition, the synchronization manager SM100 or the one or more software providing nodes SN100,SN200 may contact the second device D200 to determine the particularities of the second device D200 for the analysis if a corresponding program may be better suited for the second device D200.

The software program providing node SN200 can send in addition or alternatively to the requested one or more software programs the one or more corresponding programs via message 503. Alternatively, the software program providing node SN200 may request the second device D200 to determine which one of the requested and/or corresponding software programs should be transferred to the second device D200, e.g. by providing a selection menu via communication 503rq to the second device D200. The determination result can be communicated via communication 503rp to the software program providing node SN200, which can select the software programs according to the determination result and communicate these selected software programs via message 503 to the second device D200. The transfer of the software programs may be charged selectively according to the determination result. Other possibilities of a selective charging exist, e.g. based on the version of the transferred software programs or if a license is required.

Figure 6:
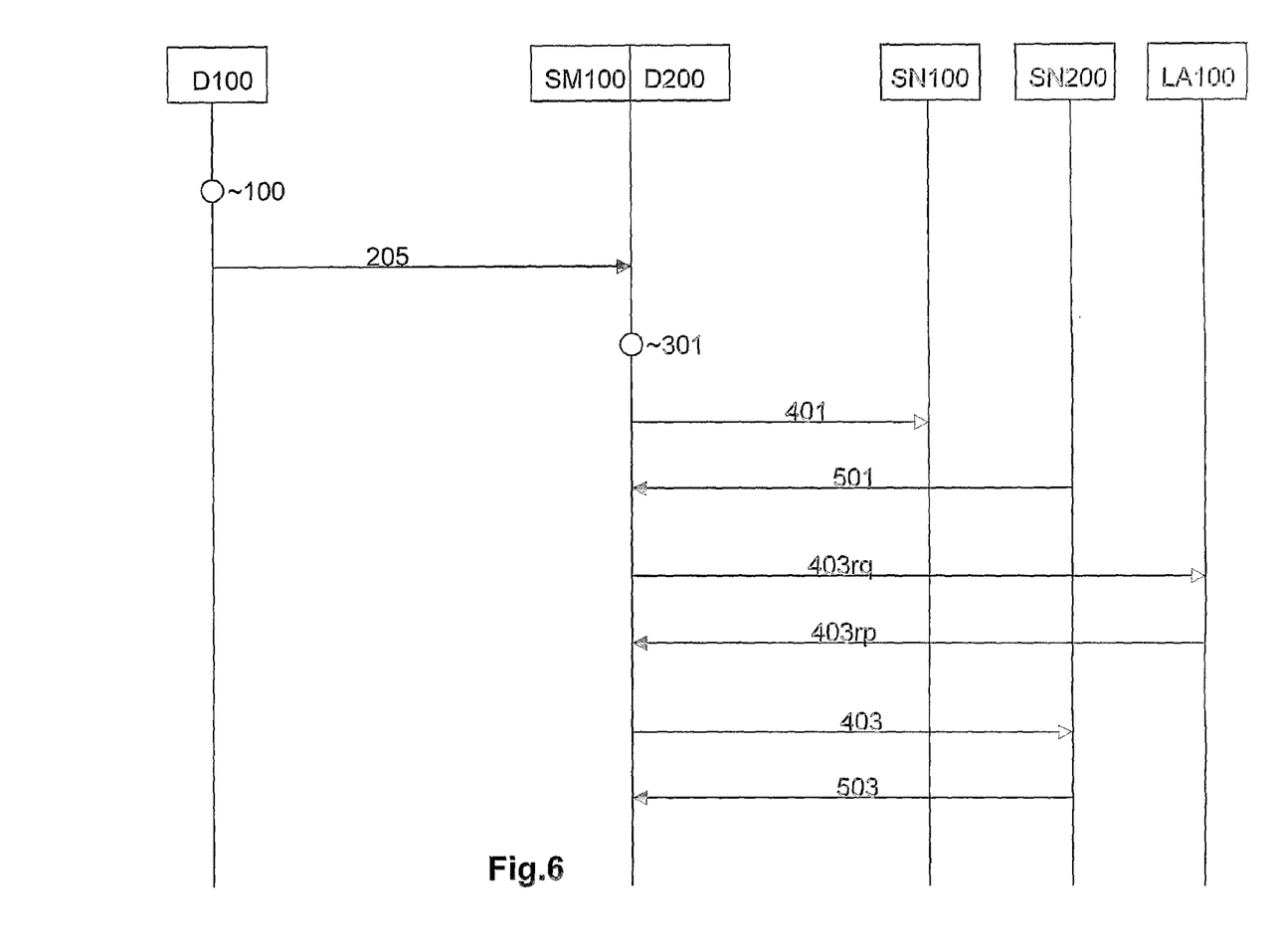
FIG. 6 shows a message flow diagram according to a fifth embodiment of the invention.

According to FIG. 6, the application profile comprises an indication that one or more of the software programs require a license. The synchronization manager SM100 detects this requirement within the identification step 301 wherein the software programs and software providing nodes are identified according to the application profile. Accordingly, a license request message 403rq can be sent to a license authority LA100 for requesting a license for said one or more software programs requiring a license for the second device D200. The license authority LA100 can respond with response message 403rp for providing a license or an indication thereof to the synchronization manager SM100. The synchronization manager SM100 can subsequently provide the license or an indication thereof to the software program providing node SN200 indicating the authorization by the license authority LA100 for the transfer of the one or more software programs requiring the license to the second device D200. An authentication of the second device D200 or a user of the second device D200 may be performed before the transfer is executed. Alternatively or in addition, the license may be charged to an account of a user of the second device D200 and/or of the first device D100. The second device D200 and/or the synchronization manager SM100 may be involved in providing or accepting charging related data for executing the charging by the license authority LA100 and/or the software program providing node SN200. Alternatively to the messages 403rq,403rp, the license authority LA100 may communicate the license or an indication thereof to the software program providing node SN200 which subsequently transfers the one or more software programs requiring the license to the second device D200. The synchronization of a software program requiring a license might result in a configuration where the software program is operable on both the first device D100 and the second device D200. Alternatively, the software program requiring a license may be no longer usable on the first device D100, but on the second device D200. The license for the software program on the first device D100 may be blocked as a consequence of the request to the license authority LA100. A communication from the license authority LA100 to the first device D100 may be necessary to block the license and thus the operation on the first device D100.

Figure 7:
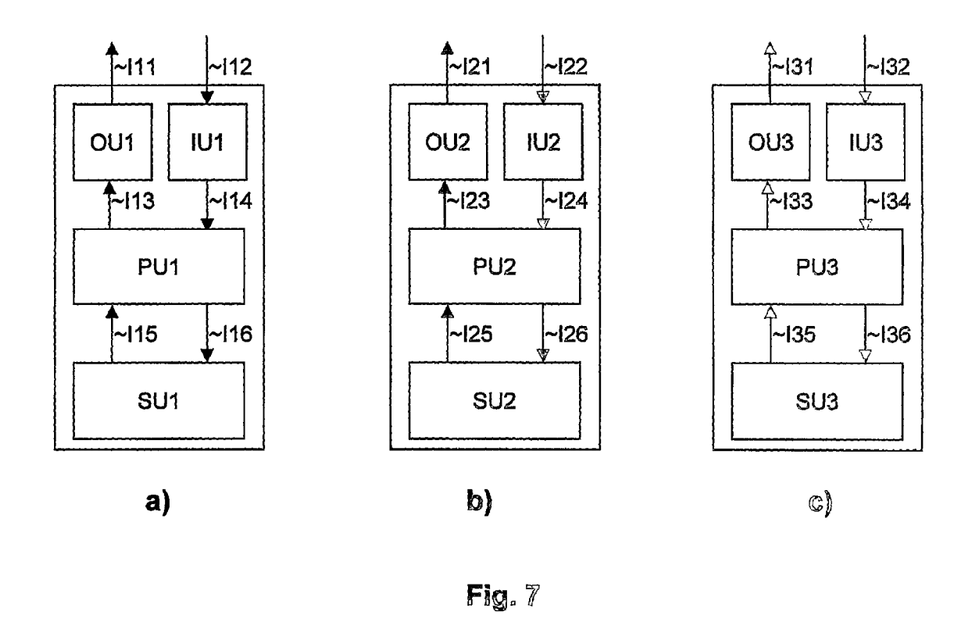
FIG. 7 shows embodiment for a first device (a), a second device (b), and a synchronization manager (c) according to the invention.

FIG. 7a depicts an embodiment of a first device with input unit IU1, output unit OU1, processing unit PU1, and storage unit PU1 and connections I11-I16 between the individual units and with the outside of the first device. Software programs can be stored on the storage unit PU1 and the processing unit PU1 can look up the stored software programs to create the application profile. Software programs on the first device may alternatively or in addition be stored externally, but may be accessible via the input unit IU1 for operation by the processing unit PU1 of the first device. The application profile can be communicated via output unit OU1 and interface I11 to the synchronization manager.

The synchronization manager can be collocated with the first device, e.g. in form of a computer program processed by the processing unit PU1 or as a device integrated into or attached to the first device. The provision of the application profile may be executed processing unit PU1 internally or via internal connections, e.g. via connection I15 when the application profile is stored on the storage unit SU1 and the identification according to the application profile is performed by the processing unit PU2. Communication to the outside, e.g. for requesting software program providing nodes to transfer the software programs to the second device, may be accomplished via the output unit OU1 and the interface I11.

FIG. 7b depicts an embodiment of the second device with input unit IU2, output unit OU2, processing unit PU2, and storage unit SU2 and connections I21-I26 between the individual units and with the outside of the second device. The reception of the software programs can be accomplished by the input unit IU2 via interface I22. The received software programs can be stored in the storage unit SU2 and operated by the processing unit PU2 on the second device.

The synchronization manager may be collocated with the second device, e.g. in form of a computer program processed by the processing unit PU2 or as a device integrated into or attached to the second device. Further communication from the outside, e.g. for the provision of the application profile, can be performed via interface I22 and input unit IU2. Communication to the outside, e.g. for requesting the software providing nodes to transfer the software programs, may be accomplished via output unit OU2 and interface I21.

FIG. 7c depicts an embodiment of a synchronization manager comprising an input unit IO3, an output unit OU3, and a processing unit PU3, and a storage unit SU3 and interconnections I31-I36. The synchronization manager can receive the application profile via input unit IU3 and interface I31 and process the application profile accordingly at the processing unit PU3. The application profile may be at least temporarily stored at the storage unit SU3. The processing unit PU3 can be further adapted to communicate via input unit IU3 and output unit OU3 with the respective entities like the software program nodes, a license authority and others e.g. described in conjunction with FIG. 2-6. The synchronization manager can be a remote device according to the embodiment described in conjunction with FIG. 2 or collocated on the first device or the second device as described in conjunction with FIG. 3 and FIGS. 4-6. In case of collocation, corresponding units of the first device and the synchronization manager, i.e. processing unit PU1 and processing unit PU3, input unit IU1 and input unit IU3, output unit OU1 and output unit OU3, storage unit SU1 and storage unit SU3, may be merged at least in part. The corresponding may apply when collocating the synchronization manager and the second device.

A unit of a device may further comprise multiple units. For example, the input unit of the second device may comprise a card reader, a Bluetooth receiver, and a UMTS receiver. The card reader and the Bluetooth receiver may be used to read the application profile from a card or to receive the application profile from the first device, respectively, and the UMTS receiver may be employed for receiving the one or more software programs.

Many variations and implementations are possible. Messages can comprise appropriate identifiers for identifying and/or authenticating involved entities like the first device, the second device, an user of the first device, an user of the second device, the synchronization manager, the one or more software program providing nodes, and the license authority. In this respect, the term message is to be understood in a broad sense comprising any kind of communications for transferring the respective information like the application profile, identifiers, indicators, license etc. or the one or more software programs from one entity to another. Messages may be communicated via fixed communication or wireless communication or via movable storage media.

Furthermore, the method is suited to synchronize one or more software programs from the second device to the first device based on a second application profile indicating the one or mores software programs on the second device and the one or more software program providing nodes from which these one or more software programs can be obtained with a corresponding processing and communication associated with the second application profile by the same or a further synchronization manager. The method may be also well suited to synchronize one or more software programs from the first device to multiple second devices using one or more application profiles and one or more synchronization managers. Any kind of device capable of operating software programs and performing communications can be used to carry out the respective steps of the method. Ensamples for the first device and the second device comprise personal computers, laptop computers, personal digital assistants, smart phones, mobile phones, and vehicles like cars.

The method can be further extended by synchronizing user data and/or device settings from the first device to the second device, e.g. by SyncML protocol and WAP UAP, respectively. The application profile may be adapted to comprise such information that triggers the synchronization of user data and/or device settings from the first device to the second device.

The invention claimed is:

1. Method for synchronizing one or more software programs from a first device to a second device, comprising the steps of:

creating an application profile comprising a license indicator for indicating and identifying a software program requiring a license, the application profile indicating the software program on the first device and on a software program node;

providing the application profile to a synchronization manager;

the synchronization manager identifying both the software program and the software program node according to the application profile;

responsive to the identification of the software program requiring a license, the synchronization manager:

requesting from a licensing authority an authorization of a transfer from the software program node to the second device;

requesting the software program node to transfer the software program requiring a license to the second device;
authenticating a user of the second device as being the same as a user of the first device; and
transferring the software program requiring a license to the second device in response to the user of the second device being authenticated.

2. The method according to claim 1, wherein the application profile comprises
at least one software program name for indicating and identifying one or more software programs,
at least one node address for indicating and identifying one or more software program nodes.

3. The method according to claim 2, wherein the application profile further comprises a version indicator for identifying and indicating at least one version of the software program.

4. The method according to claim 3, wherein a corresponding software program is transferred instead of or in addition to the software program according to the application profile as a result of analysis of the corresponding software program, the corresponding program being better suited for particularities of the second device than the software program.

5. The method according to claim 2, wherein the application profile comprises one or more license authority addresses for indicating one or more license authorities to be contacted for authorizing the transfer of the one or more respective software programs to the second device.

6. The method according to claim 2 further comprising the step of a selective charging for the transferred one or more software programs.

7. The method according to claim 2, wherein the step of creating the application profile is performed whenever a change of the one or more software programs on the first device occurs.

8. A synchronization manager for synchronizing one or more software programs from a first device to a second device, wherein the synchronization manager comprises:
a processor; and
a memory containing instructions that, when executed by the processor, cause the synchronization manager to:
receive an application profile comprising a license indicator for indicating and identifying a software program requiring a license, the application profile indicating the software program on the first device and on a software program node;
identify both the software program and the software program node according to the application profile;
responsive to the identification of the software program requiring a license:
request from a licensing authority an authorization of a transfer from the software program node to the second device; and
request the software program node to transfer the software program requiring a license to the second device;
authenticate a user of the second device as being the same as a user of the first device; and
transfer the software program requiring a license to the second device in response to the user of the second device being authenticated.

9. The synchronization manager according to claim 8, wherein the synchronization manager is adapted to process the application profile, which comprises
at least one software program name indicating one of the one or more software programs and
at least one node address indicating one of the one or more software program nodes for identifying the one or more software programs and the one or more software program nodes.

10. The synchronization manager according to claim 8, wherein the synchronization manager is further adapted to process the application profile comprising at least one version indicator indicating at least one version of the one or more software programs for identifying the at least one version of the one or more software programs.

11. The synchronization manager according to claim 8, wherein for at least a part of the one or more software programs according to the application profile one or more corresponding software programs exist and the synchronization manager is adapted to process the one or more corresponding software programs that are transferred instead of or in addition to said part of the one or more software programs according to the application profile as a result of an analysis of said part of the one or more software programs according to the application profile and the one or more corresponding software programs, the one or more corresponding programs being better suited for particularities of the second device than the one or more software programs.

12. The synchronization manager according to claim 8, wherein the application profile comprises one or more license authority addresses for indicating one or more license authorities to be contacted for authorizing the transfer of the one or more respective software programs to the second device.

13. The synchronization manager according to claim 8, wherein the instructions, when executed by the processor, further cause the synchronization manager to process and provide data for a selective charging of the transferred one or more software programs.

14. The synchronization manager according to claim 8, wherein the synchronization manager is operated on a server in a communications network.

15. A first device comprising a processor and an output unit, wherein the processor is adapted to create an application profile indicating one or more software programs on the first device and indicating one or more software program nodes from which said one or more software programs are obtainable, the application profile comprising at least one license indicator for indicating and identifying at least a part of the one or more software programs requiring a license, and to execute, for synchronization of the one or more software programs to a second device in dependence on the user of the second device being authenticated, a transfer of the application profile to at least one of
a synchronization manager,
the second device, and
an application profile storage node in a communications network.

16. The first device according to claim 15, wherein the application profile comprises one or more license authority addresses to be contacted for authorizing the transfer of the one or more respective software programs to the second device.

17. The first device according to claim 15, wherein the processor is adapted to create the application profile whenever a change of the one or more software programs on the first device occurs.

18. The first device according to claim 15, wherein for the transfer of the application profile
the processor is adapted to generate a message comprising the application profile and to send the message via the output unit for the transfer of the application profile, and the processor is adapted to store the application profile on a non-transitory movable storage medium being removable from the output unit for the transfer of the application profile.

19. The first device according to claim 16, wherein the first device is further adapted to operate the synchronization manager wherein the synchronization manager comprises instructions adapted to perform the following operations when executed on the first device:
- receive an application profile comprising a license indicator for indicating and identifying a software program requiring a license, the application profile indicating the software program on the first device and on a software program node;
- identify both the software program and the software program node according to the application profile;
- responsive to the identification:
  - request from a licensing authority an authorization of a transfer from the software program node to the second device, the software program requiring a license;
  - request the software program node to transfer the software program requiring a license to the second device; and
  - transfer the software program requiring a license to the second device.

20. A second device comprising an input unit and an output unit, wherein the second device is adapted to operate a synchronization manager, wherein the synchronization manager includes:
- a processor; and
- a memory containing instructions that, when executed by the processor, cause the synchronization manager to:
  - receive an application profile comprising a license indicator for indicating and identifying a software program requiring a license, the application profile indicating the software program on a first device and on a software program node;
  - provide the application profile to a synchronization manager;
  - identify both the software program and the software program node according to the application profile;
  - authenticate a user of the second device as being the same as a user of the first device; and
  - responsive to the identification of the software program:
    - request from a licensing authority an authorization of a transfer from the software program node to the second device; and
    - request the software program node to transfer the software program requiring a license to the second device; and
  - responsive to the user of the second device being authenticated:
    - transfer the software program requiring a license to the second device,
- wherein the second device is adapted to receive the one or more software programs via the input unit.

21. The second device according to claim 20, wherein the synchronization manager is adapted to receive the application profile via the input unit from at least one of an application profile storage node in a communications network, the first device, and a non-transitory movable storage medium.

22. The method according to claim 1, wherein the first and second devices use different operating systems.

* * * * *